US006875152B2

(12) United States Patent
Iwatuki et al.

(10) Patent No.: US 6,875,152 B2
(45) Date of Patent: Apr. 5, 2005

(54) VEHICLE DRIVE LINE CONTROLLER

(75) Inventors: Kunihiro Iwatuki, Toyota (JP);
Hiroyuki Shiori, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/466,679

(22) PCT Filed: Jan. 21, 2002

(86) PCT No.: PCT/IB02/00150
§ 371 (c)(1),
(2), (4) Date: Aug. 28, 2003

(87) PCT Pub. No.: WO02/057107
PCT Pub. Date: Jul. 25, 2002

(65) Prior Publication Data
US 2004/0128048 A1 Jul. 1, 2004

(30) Foreign Application Priority Data
Jan. 22, 2001 (JP) ........................................ 2001-013744

(51) Int. Cl.[7] ........................ F16H 37/02; B60K 41/12
(52) U.S. Cl. ........................ 477/44; 477/41; 475/210; 701/54
(58) Field of Search ............................ 477/41, 44, 37, 477/902; 475/210, 211; 701/53–55

(56) References Cited

U.S. PATENT DOCUMENTS

| | | | | |
|---|---|---|---|---|
| 5,243,881 A | * | 9/1993 | Hayashi | 477/45 |
| 6,157,885 A | * | 12/2000 | Sakaguchi et al. | 701/54 |
| 6,359,404 B1 | * | 3/2002 | Sugiyama et al. | 318/432 |
| 6,409,625 B1 | * | 6/2002 | Sakai et al. | 475/208 |
| 6,565,481 B2 | * | 5/2003 | Toukura et al. | 477/107 |
| 6,602,163 B2 | * | 8/2003 | Tamura et al. | 477/98 |
| 6,663,532 B1 | * | 12/2003 | McIndoe et al. | 477/43 |

FOREIGN PATENT DOCUMENTS

| | | |
|---|---|---|
| DE | 196 31 236 A | 2/1997 |
| EP | 0 497 038 A | 8/1992 |
| JP | 08326893 | 12/1996 |
| JP | 10141101 | 5/1998 |
| WO | WO 96 35063 A | 11/1996 |

* cited by examiner

Primary Examiner—Tisha Lewis
(74) Attorney, Agent, or Firm—Oliff & Berridge, PLC

(57) ABSTRACT

In a controller of a vehicle transmission, the transmission includes a continuously variable transmission 3 and a planetary gear mechanism 4 and is coupled to an output of an engine 1. The transmission includes a first shift mode using only the continuously variable transmission 3 and a second shift mode using in combination the continuously variable transmission 3 and the planetary gear mechanism 4.

The controller determines the shift mode based on load of the engine 1 according to a required output and an input/output revolution speed ratio $\gamma$ of the continuously variable transmission 3, and switches between the above two shift modes at the predetermined input/output revolution speed ratio.

39 Claims, 10 Drawing Sheets

FIG. 8

| RANGE | | CLUTCH Cd | CLUTCH Ch | BRAKE Br |
|---|---|---|---|---|
| R | | | | ○ |
| P · N | | | | |
| D | L MODE | ○ | | |
| | H MODE | | ○ | |

VEHICLE DRIVE LINE CONTROLLER

BACKGROUND OF THE INVENTION

1. Field of the Invention

The invention relates to a vehicle controller that includes a transmission coupled to the output of a power engine and capable of changing the gear ratio and the shift mode by using a continuously variable transmission and a gearshift mechanism.

2. Description of the Related Art

Conventionally, belt-type and traction-type (toroidal-type) transmission mechanisms are known as a continuously variable transmission mechanism for use in a vehicle transmission. These continuously variable transmission mechanisms transmit the torque by using the friction force between a transmitting member such as belt and power roller and a rotor such as pulley and disc, shearing force of an oil film, and the like, in order to continuously vary the gear ratio. This restricts the transmittable torque, reduces the power transmission efficiency when the gear ratio is large or small, and also limits a practically applicable gear ratio.

Conventionally, the transmission is not constructed using a continuously variable transmission mechanism alone but is constructed using combination of a continuously variable transmission mechanism and a gear mechanism such as a planetary gear mechanism. One example of such a transmission is described in JP-A-11-504415. The example of the transmission described in this publication will be described briefly. A driving pulley of the continuously variable transmission mechanism is coupled to the engine, and a driven pulley thereof is coupled to a sun gear of the planetary gear mechanism. A ring gear, which is arranged concentrically with the sun gear, is coupled to the output shaft of the transmission. A carrier holding a pinion gear meshed with the sun gear and the ring gear is coupled to the input shaft of the transmission through the gear mechanism and a clutch. In order to integrally rotate the whole planetary gear mechanism, a so-called integrating clutch for selectively coupling the prescribed two rotating elements in the planetary gear, that is, the sun gear and the ring gear, is provided.

When the integrating clutch couples the sun gear and the ring gear so as to integrate the whole planetary gear mechanism, the output torque of the engine is transmitted from the input shaft of the transmission to the planetary gear mechanism and the output shaft of the transmission through the continuously variable transmission mechanism. As a result, the gear ratio of the continuously variable transmission mechanism itself becomes the overall gear ratio of the transmission. On the other hand, the output torque of the continuously variable transmission mechanism is transmitted to the sun gear, and at the same time, the torque is transmitted from the input shaft to the carrier through the gear mechanism. In this case, the revolutions speed of the sun gear becomes smaller than that of the carrier as the gear ratio set by the continuously variable transmission mechanism increases. In other words, the revolution speed of the ring gear as the output revolution speed becomes larger than that of the carrier.

The transmission described in the above publication is capable of setting the following two modes: a mode (shift mode) in which the overall gear ratio of the transmission increases with increase in the gear ratio of the continuously variable transmission mechanism; and a mode (shift mode) in which the overall gear ratio of the transmission decreases with increase in the gear ratio of the continuously variable transmission mechanism.

The continuously variable transmission capable of continuously varying the gear ratio is advantageous in that, when used as a transmission of a vehicle driven by a power engine, the continuously variable transmission is capable of arbitrarily setting the revolution speed of the power engine, allowing improvement in power consumption. However, regarding the technology of cooperatively controlling a power engine and a transmission capable of changing the shift mode by using a continuously variable transmission mechanism and a planetary gear mechanism as described in the above publication, problems and means for solving them have not been sufficiently considered. Moreover, the above publication does not describe this type of control.

SUMMARY OF THE INVENTION

The invention is made in view of the above problems. It is an object of the invention to provide a controller capable of improving fuel consumption and drivability by cooperatively controlling a power engine and a transmission including a continuously variable transmission and capable of changing the above shift mode. A controller according to one aspect of the invention includes a power engine and a continuously variable transmission. In the controller, a transmission coupled to an output of the power engine includes the continuously variable transmission and a gearshift mechanism. The controller is capable of selectively setting a first shift mode in which a gear ratio increases with increase in an input/output revolution ratio, that is, a ratio between an input revolution speed and an output revolution speed of the continuously variable transmission, and a second shift mode in which the gear ratio decreases with increase in the input/output revolution ratio. The controller obtains target torque based on control data including a required output of the vehicle, and controls load of the power engine so as to achieve the target torque. The controller also obtains a target input revolution speed based on the control data and calculates the input/output revolution ratio of the continuously variable transmission so as to achieve the target input revolution speed. The controller then determines a shift mode to be set, based on the input/output revolution ratio calculated by the input/output revolution ratio calculating means (S5).

With this structure, shift shock as well as shift delay can be avoided during switching between different shift modes that are set in the transmission. Moreover, the engine can be operated with optimum fuel consumption.

BRIEF DESCRIPTION OF THE DRAWINGS

Hereinafter, the invention will be described in conjunction with the following drawings. Each numeral in the figures denotes a corresponding member.

FIG. 8 is a table showing the correspondence between the running state of a vehicle and the engaged/released state of each clutch and a brake;

DESCRIPTION OF THE PREFERRED EMBODIMENTS

Figure 1:
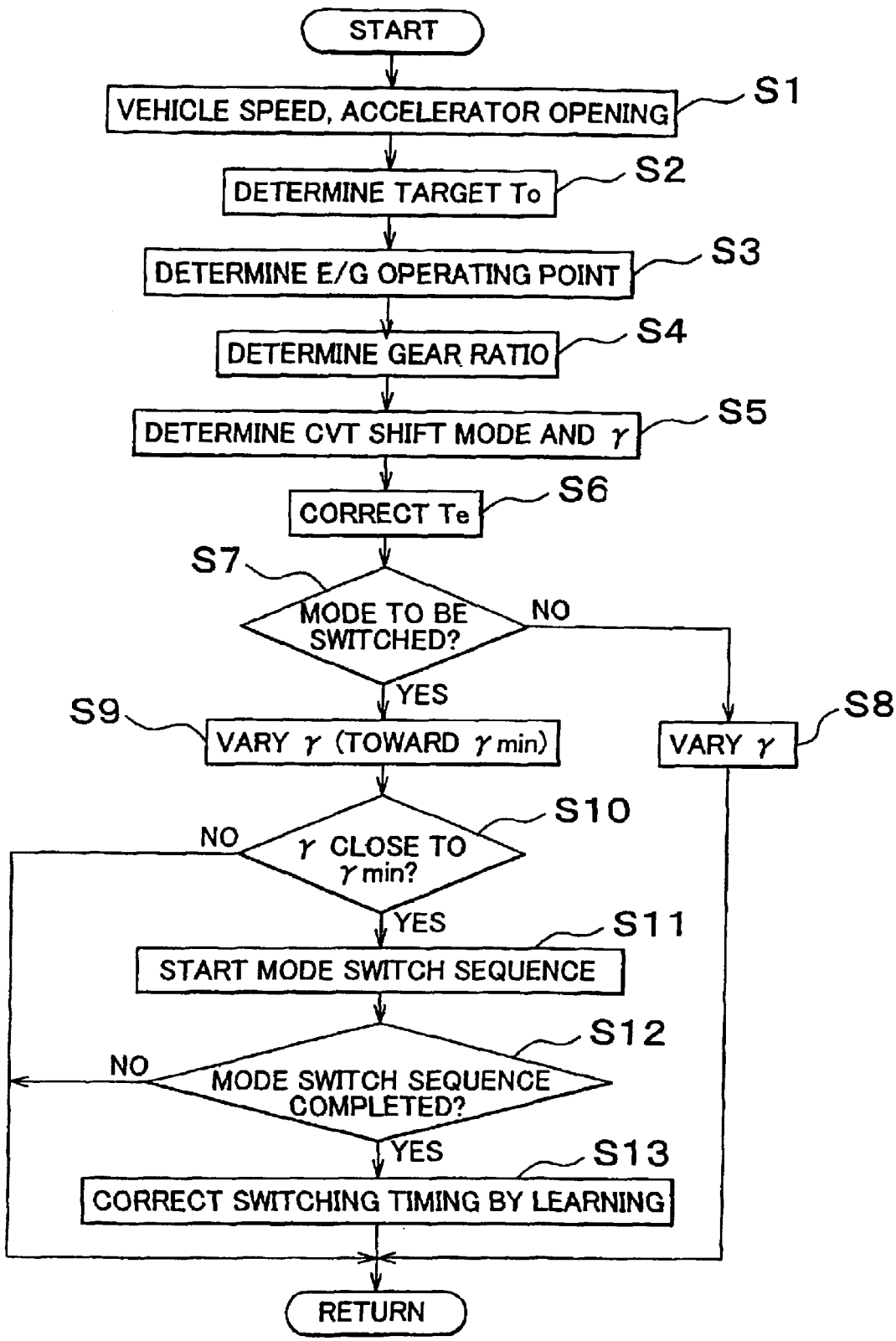
FIG. 1 is a flowchart illustrating an example of the control by a controller according to the invention.

Hereinafter, the invention will be described in terms of a specific example. First, an exemplary driving system (power train) in a vehicle intended to be used in the invention will be described with reference to FIG. 6. In the illustrated example, a transmission 2 is coupled to the output of an engine 1, i.e., a power engine, for example an internal combustion engine. The engine 1 is a power plant for outputting power by fuel combustion. Accordingly, an engine such as gasoline engine, diesel engine and natural gas engine can be employed as the engine 1. The engine 1 may be combined with a motor or a motor generator. The engine 1 is capable of electrically controlling the load such as throttle opening. The engine 1 including an electronic throttle valve is exemplarily used herein. The transmission 2 is mainly composed of a belt-type continuously variable transmission 3 and a single-pinion type planetary gear mechanism 4 serving as a gearshift mechanism.

An input shaft 5, an input member, is arranged coaxially with the output shaft of the engine 1. The input shaft 5 and the engine 1 are coupled to each other through a damper 6, so that the output shaft of the engine 1 and the input shaft 5 always rotate together.

A driving pulley 7, one rotor in the continuously variable transmission 3, is mounted to the input shaft 5. The driving pulley 7 varies the gap between a fixed sheave and a movable sheave, that is, the groove width of the driving pulley 7, by moving the movable sheave with respect to the fixed sheave in the axial direction. Note that the movable sheave is arranged on the side away from the engine 1, that is, on the left side in FIG. 6, with respect to the fixed sheave. Accordingly, an actuator 8 for axially moving the movable sheave in both directions is arranged on the back side of the movable sheave, that is, on the left side in FIG. 6.

A driven pulley 9, the other rotor in the continuously variable transmission 3, is arranged on the same plane as the rotation plane of the driving pulley 7. The driven pulley 9 has the same structure as that of the driving pulley 7. More specifically, the driven pulley 9 has a fixed sheave and a movable sheave, and varies its groove width by moving the movable sheave in the forward and backward directions using an actuator 10. Note that the respective groove widths of the driving pulley 7 and the driven pulley 9 are controlled so that the groove width of one pulley decreases with increase in the groove width of the other pulley. The respective groove widths are varied so as not to change the central position of the driving pulley 7 and the driven pulley 9 in the axial direction.

A belt 11, a power-transmission member, is mounted on the driving pulley 7 and the driven pulley 9. By varying the respective groove widths of the driving pulley 7 and the driven pulley 9 in the opposite directions, the respective effective diameters of the driving pulley 7 and the driven pulley 9 on which the belt 11 is mounted vary. As a result, the input/output revolution ratio γ of the continuously variable transmission 3, that is, the ratio between the revolution speed of the driving pulley 7 (the input revolution speed of the continuously variable transmission 3) and the revolution speed of the driven pulley 9 (the output revolution speed of the continuously variable transmission 3) varies continuously. An intermediate shaft 12 is mounted to the driven pulley 9 in order to receive and output the torque to and from the driven pulley 9.

Hereinafter, the planetary gear mechanism 4 will be described. The planetary gear mechanism 4 in FIG. 6 includes as rotating elements a sun gear 13, a ring gear 14 and a carrier 15. The sun gear 13 is an external gear. The ring gear 14 is an internal gear that is arranged concentrically with the sun gear 13. The carrier 15 holds a pinion gear meshed with the sun gear 13 and the ring gear 14 so that the pinion gear can rotate on its axis and revolve about the sun gear. The planetary gear mechanism 4 is arranged between the input shaft 5 of the driving pulley 7 and the intermediate shaft 12 of the driven pulley 9.

An output shaft 16 extends through the planetary gear mechanism 4 along the central axis of the driving pulley 7 and the driven pulley 9. The output shaft 16 extends toward the belt 11 at its one end. This end of the shaft 16 and the ring gear 14 are coupled together by an appropriate coupling member such as connecting drum. The planetary gear mechanism 4 includes a direct-coupling clutch Cd for selectively coupling the ring gear 14 and the sun gear 13. More specifically, the direct-coupling clutch Cd serves to couple the two rotating elements of the planetary gear mechanism 4, the ring gear 14 and the sun gear 13, so as to integrally rotate the whole planetary gear mechanism 4.

A hollow shaft integrated with the sun gear 13 is rotatably fitted on the outer periphery of the output shaft 16. The hollow shaft extends in the direction away from the direct-coupling clutch Cd at its one end. A driving gear 17A is mounted at that end of the hollow shaft. A driven gear 17B is also mounted at the end of the hollow shaft located away from the direct-coupling clutch Cd. The driven gear 17B meshes with the driving gear 17A. In other words, the hollow shaft and the intermediate shaft 12 are coupled to each other through the driving gear 17A and the driven gear 17B. Note that the driving gear 17A and the driven gear 17B together form a decelerating mechanism from the intermediate shaft 12 toward the hollow shaft.

A driving gear 18A is rotatably fitted on the outer periphery of the input shaft 5. The planetary gear mechanism 4 includes a coupling clutch Ch for selectively coupling the driving gear 18A and the input shaft 5. A driven gear 18B meshed with the driving gear 18A is rotatably fitted on the outer periphery of the hollow shaft. The driving gear 18A has a larger diameter than that of the driven gear 18B. The driving gear 18A and the driven gear 18B form a decelerating mechanism from the driving gear 18A toward the driven gear 18B. More specifically, provided that the gear ratio between the driving gear 17A and the driven gear 17B is α, the gear ratio between the gear pair of the driving gear 18A and the driven gear 18B is set to ($\gamma_{min} \times \alpha$). Note that $\gamma_{min}$ is the minimum value of the input/output revolution ratio γ that is set by the continuously variable transmission 3.

Accordingly, when the torque from the engine 1 is transmitted to the sun gear 13 through the continuously variable transmission 3, the driving gear 17A and the driven gear 17B, and at the same time transmitted to the carrier 17 through the driving gear 18A and the driven gear 18B, the sun gear 13 and the carrier 15 rotate at the same speed. Accordingly, the whole planetary gear mechanism 4 rotates integrally. This state is the same as the state in which the direct-coupling clutch Cd is engaged.

Figure 6:
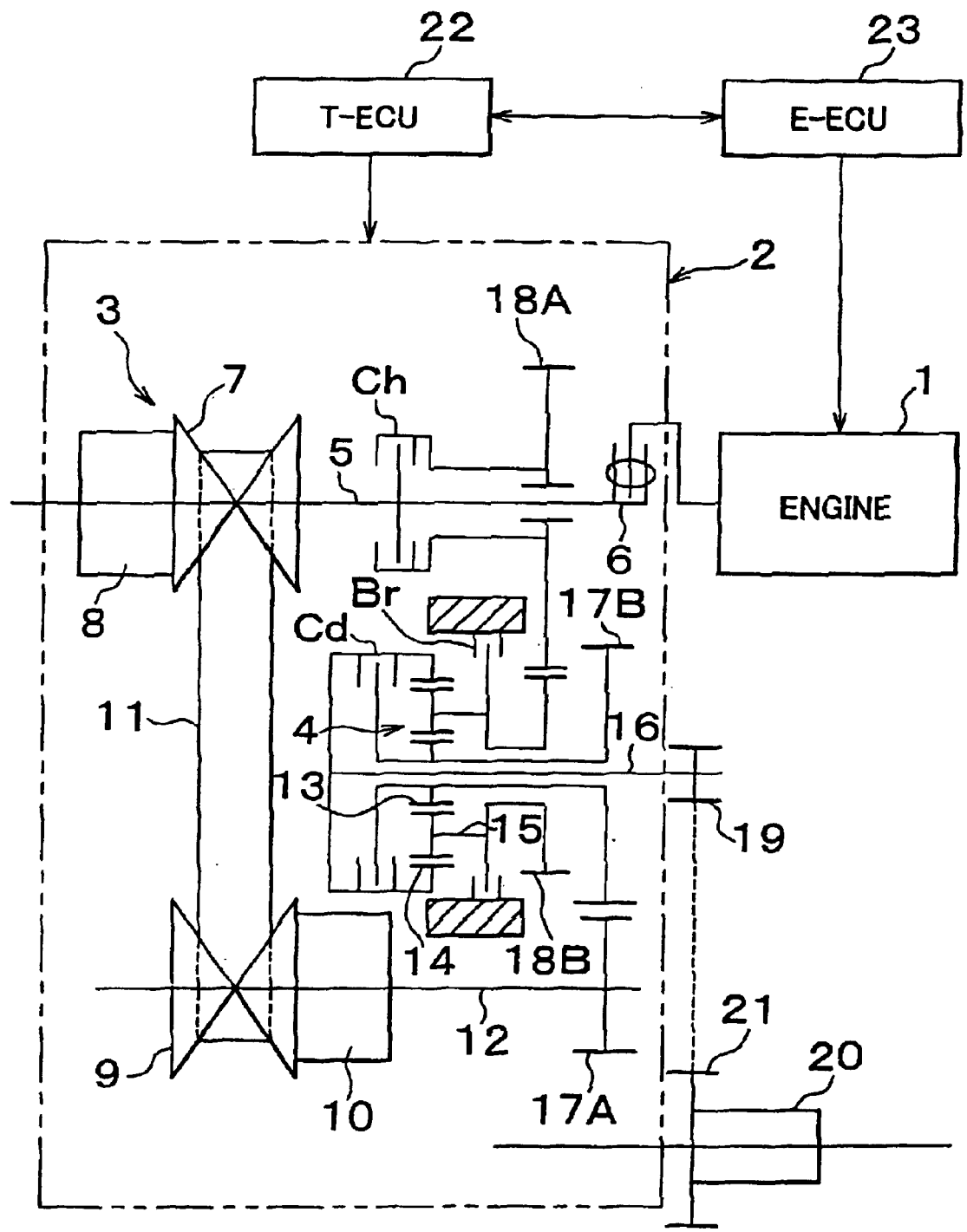
FIG. 6 is a skeleton diagram schematically showing an example of a driving system of a vehicle including a transmission.

The driven gear 18B is coupled to the carrier 15 in the planetary gear mechanism 4. A brake Br is provided as a fixing means for selectively fixing the driven gear 18B and the carrier 15. In the example of FIG. 6, a friction brake, that is, a wet type multiple-disc brake, is used as the brake Br. Note that the brake Br needs only be of a friction type. Therefore, a band brake may be used as the brake Br. The only requirement for the brake Br is the capability to selectively stop rotation of the carrier 15. Therefore, the brake Br may be arranged coaxially with the input shaft 5 so as to fix the coupling clutch Ch or the driving gear 18A.

An output gear 19, an output member, is mounted at the other end of the output shaft 16, that is, the end located away from the belt 11. For example, the output gear 19 is meshed with a ring gear 21 of a front differential 20 so as to output torque to the front differential 20.

Note that, by way of example, each of the direct-coupling clutch Cd, the coupling clutch Ch and the brake Br is herein of a hydraulic type. Accordingly, although not particularly shown in the figures, a hydraulic controller is provided in order to control these engaging/releasing mechanisms. The driving system includes an electronic control unit for the transmission (T-ECU) 22 for controlling the engaged/released state of the engaging/releasing mechanisms and controlling the input/output revolution ratio $\gamma$ that is set in the continuously variable transmission 3. The T-ECU 22 is a unit based on a microcomputer. Detection signals such as vehicle speed, accelerator opening, oil temperature, input/output revolution speeds of the transmission 2 and revolution speeds of the driving pulley 7 and the driven pulley 9 are input to the T-ECU 22. The T-ECU 22 conducts shift-mode switching and shift control as described below according to the above input signals and pre-stored data and programs.

The driving system further includes an electronic control unit for the engine (E-ECU) 23 for electrically controlling the load of the engine 1. Like the T-ECU 22, the E-ECU 23 is a unit based on a microcomputer. For example, the E-ECU 23 obtains the target torque based on the control data including the required output represented by the accelerator opening and the like, and the running state such as vehicle speed, and sets the load of the engine 1 so that the output torque reaches the target torque. The T-ECU 22 and the E-ECU 23 are connected so that they are capable of data communications with each other.

The transmission 2 including the continuously variable transmission 3 and the planetary gear mechanism 4 is capable of conducting shifting operation in two shift modes. One of the shift modes is a shift mode in which only the shifting function of the continuously variable transmission 3 is used to set the gear ratio, that is, a shift mode in which the gear ratio $\Gamma$ of the transmission 2 increases/decreases with increase/decrease in the input/output revolution ratio $\gamma$ of the continuously variable transmission 3. This shift mode is herein referred to as direct mode or L mode. The other shift mode is a shift mode in which both the shifting function of the continuously variable transmission 3 and the shifting function of the planetary gear mechanism 4 are used to set the gear ratio, that is, a shift mode in which the gear ratio $\Gamma$ of the transmission 2 varies in the direction opposite to that of the input/output revolution ratio $\gamma$ of the continuously variable transmission 3. This shift mode is herein referred to as a power recirculation mode or H mode. Hereinafter, the above two shift modes will be described in conjunction with the shifting function of the transmission 2.

First, when starting the engine 1, the direct-coupling clutch Cd, the coupling clutch Ch and the brake Br are rendered in a released state (i.e., disengaged state). In the case where the engine 1 drives a hydraulic pump (not shown) for operating the direct-coupling clutch Cd and the coupling clutch Ch, the above engaging elements are rendered in the released state without particular control before starting the engine 1. However, in the case where the driving system includes a means for accumulating the hydraulic pressure of the hydraulic pump or in the case where another power source drives the hydraulic pump, the above elements are rendered in the released state by discharging the hydraulic pressure from the hydraulic pump serving as a means for engaging the above elements. Accordingly, when starting the engine 1, the carrier 15 will neither function as a reacting element nor an input element since the input shaft 5 is disengaged from the driving gear 18A and the brake Br is released. Moreover, the direct-coupling clutch Cd is released and thus the planetary gear mechanism 4 is not integrated. Therefore, no torque will be transmitted from the engine 1 to the output shaft 16. In other words, the engine 1 is started with the transmission 2 being rendered in the neutral state.

Hereinafter, description will be given for the case where the vehicle is started. When the vehicle is started in the forward direction, the gear ratio $\Gamma$ of the transmission 2 must be increased as soon as the engine 1 is started. Accordingly, the groove width of the driving pulley 7 in the continuously variable transmission 3 is maximized so as to minimize the effective diameter of the driving pulley 7 on which the belt 11 is mounted, and at the same time, the groove width of the driven pulley 9 is minimized so as to maximize the effective diameter of the driven pulley 9 on which the belt 11 is mounted. Thus varying the respective effective diameters of the belt 11 on the driving pulley 7 and the driven pulley 9 maximizes the input/output revolution ratio $\gamma$ of the continuously variable transmission 3 ($\gamma$ max). At the maximum input/output revolution ratio $\gamma$ max, the sun gear 13 and the ring gear 14 are gradually engaged with each other by the direct-coupling clutch Cd. In other words, by gradually increasing the engaging hydraulic pressure for operating the direct-coupling clutch Cd, the sun gear 13 and the ring gear 14 change from the disengaged state to the completely engaged state through the slip state. The above operation gradually increases the torque transmitted from the engine 1, that is, the torque capacity. Therefore, the torque capacity on the output shaft 16 varies gently, allowing smooth starting of the vehicle.

Figure 7:
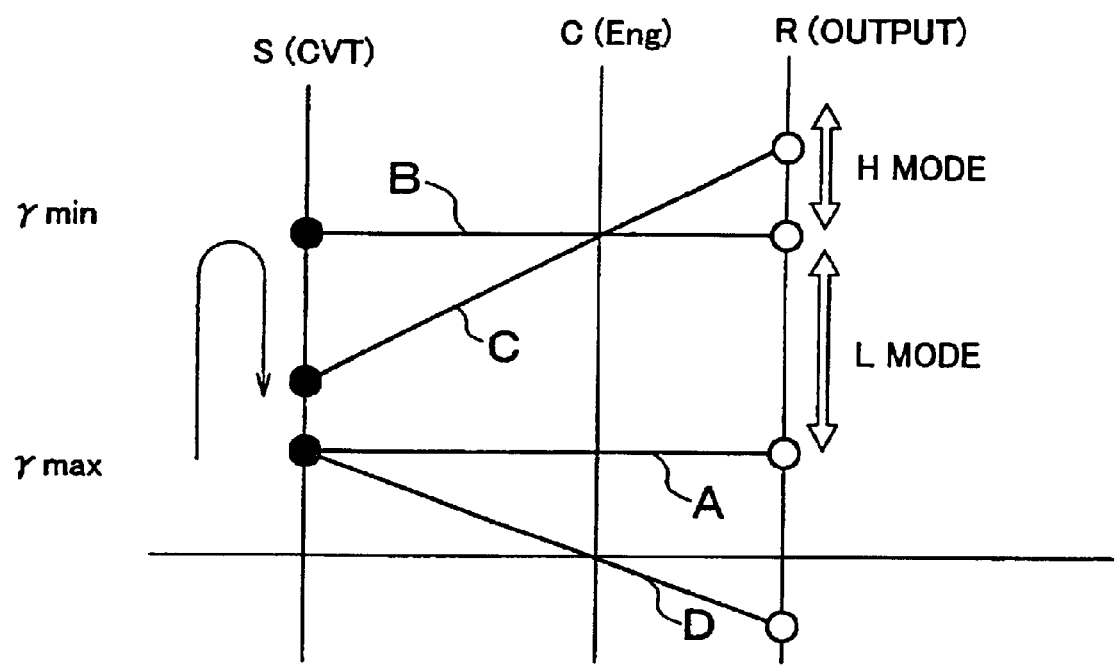
FIG. 7 is an alignment chart illustrating shift operation of the transmission.

FIG. 7 is an alignment chart showing the above state for the planetary gear mechanism 4. With the direct-coupling clutch Cd engaging the sun gear 13 and the ring gear 14, the whole planetary gear mechanism 4 rotates integrally. Accordingly, the torque is transmitted from the engine 1 (Eng) to the sun gear 13 through the continuously variable transmission 3 (CVT). The ring gear 14 serving as an output element and the output shaft 16 coupled thereto thus rotate in the same direction at the same speed together with the sun gear 13 serving as an input element. This operating state is shown by line A in FIG. 7.

The input/output revolution ratio $\gamma$ of the continuously variable transmission 3 is reduced from the above state. More specifically, the groove width of the driving pulley 7 is gradually reduced to increase the effective diameter thereof, and the groove width of the driven pulley 9 is gradually increased to reduce the effective diameter thereof. As a result, the relative input revolution speed to the planetary gear mechanism 4 increases gradually. Since the whole planetary gear mechanism 4 rotates integrally, the revolution speed of the output shaft 16 relative to the engine speed increases with a change in the input/output revolution ratio γ of the continuously variable transmission 3. In other words, provided that the vehicle speed does not vary, the engine speed decreases with decrease in the gear ratio of the continuously variable transmission 3. Such change in the operating state is shown by line A in FIG. 7 translated upward, i.e., in the direction in which the revolution speed increases. The state in which the planetary gear mechanism 4 is rendered in a so-called direct-coupled state so as to minimize the input/output revolution ratio γ of the continuously variable transmission 3, i.e., to set the input/output revolution ratio γ to the minimum value $\gamma_{min}$ corresponding to the highest speed, is shown by line B in FIG. 7.

As described above, the direct mode (L mode) is the state in which the direct-coupling clutch Cd engages the sun gear 13 with the ring gear 14 and the coupling clutch Ch disengages the driving gear 18A from the input shaft 5. In the direct mode, a change in the input/output revolution ratio γ of the continuously variable transmission 3 appears as a change in the overall gear ratio Γ of the transmission 2.

When the input/output revolution ratio γ of the continuously variable transmission 3 has the minimum value $\gamma_{min}$ the gear ratio between the driving gear 18A and the driven gear 18B is ($\gamma_{min} \times \alpha$), where α is the gear ratio between the driving gear 17A and the driven gear 17B, which are between the intermediate shaft 12 and the hollow shaft. Therefore, the revolution speed of the driving gear 18A matches the engine speed. This allows engaging of the coupling clutch Ch as well as release of the direct-coupling clutch Cd without causing any rotational fluctuation in each rotating member and without changing the output shaft torque from the transmission 2. The minimum value $\gamma_{min}$ of the input/output revolution ratio γ is a predetermined input/output revolution ratio suitable for the shift mode of the invention.

Such engaging and releasing of the clutches is conducted so that the carrier 15 has a revolution speed according to the engine speed, and the revolution speed of the sun gear 13 is varied by the continuously variable transmission 3. This enables setting of a so-called overdrive state. The overdrive state herein refers to the state in which the gear ratio Γ of the transmission 2 is set to a value smaller than the minimum value that can be set by the continuously variable transmission 3 alone.

The above state is shown by Line C in FIG. 7. In this state, the revolution speed of the carrier 15 according to the engine speed is maintained and the input/output revolution ratio γ of the continuously variable transmission 3 is increased so that the revolution speed of the sun gear 13 is reduced. As a result, the respective revolution speeds of the ring gear 14 serving as an output element and the output shaft 16 coupled thereto are increased. In other words, the overall gear ratio Γ of the transmission 2 is further reduced. Provided that the vehicle speed does not change, the engine speed is reduced. This is called the power recirculation state.

As described above, the power recirculation mode (H mode) is the state in which the direct-coupling clutch Cd disengages the sun gear 13 from the ring gear 14 and the coupling clutch Ch engages the driving gear 18A with the input shaft 5. In this mode, the overall gear ratio Γ of the transmission 2 varies in the direction opposite to that of the input/output revolution ratio γ of the continuously variable transmission 3. More specifically, by increasing the input/output revolution ratio γ of the continuously variable transmission 3, the gear ratio Γ can be set to a value smaller than the value that can be set by the continuously variable transmission 3 alone.

Note that, as described above, provided that the input/output revolution ratio γ of the continuously variable transmission 3 is set to the minimum value $\gamma_{min}$, the whole transmission 2 rotates integrally even when the direct-coupling clutch Cd is released. This state, which corresponds to the highest speed in the direct mode (L mode) and the lowest speed in the power recirculation mode (H mode), is common to each shift mode. In other words, the minimum value $\gamma_{min}$ of the input/output revolution ratio γ corresponds to the shift point, that is, the switch point, from one shift mode to the other mode. Note that the shift point is determined by the respective gear ratios between the driving gear 17A and the driven gear 17B and between the driving gear 18A and the driven gear 18B.

Releasing both the direct-coupling clutch Cd and the coupling clutch Ch, and engaging the brake Br enable reverse running of the vehicle. More specifically, by engaging the brake Br, the carrier 15 is fixed in the planetary gear mechanism 4. In this state, the torque is input to the sun gear 13 through the continuously variable transmission 3. Accordingly, the ring gear 14 serves as an output element, so that the output shaft 16 coupled thereto rotates in the direction opposite to that of the sun gear 13. This state is shown by line D in FIG. 7.

FIG. 8 collectively shows the engaged/released state of each engaging/releasing mechanism for setting the direct mode (L mode), the power recirculation mode (H mode) and the reverse-running mode. In FIG. 8, the term "range" refers to a running mode of the vehicle selected by manual operation, where "R" indicates the range for reverse running, "P" indicates the range for maintaining the stopped state, "N" indicates the range for setting the neutral state, and "D" indicates the range for forward running. In FIG. 8, each blank indicates a released state, and " " indicates an engaged state. For example, the torque capacity transmitted in the engaged state can be arbitrarily set by adjusting by an electromagnetic value (not shown) the hydraulic pressure for operating a clutch to be engaged.

Figure 9:
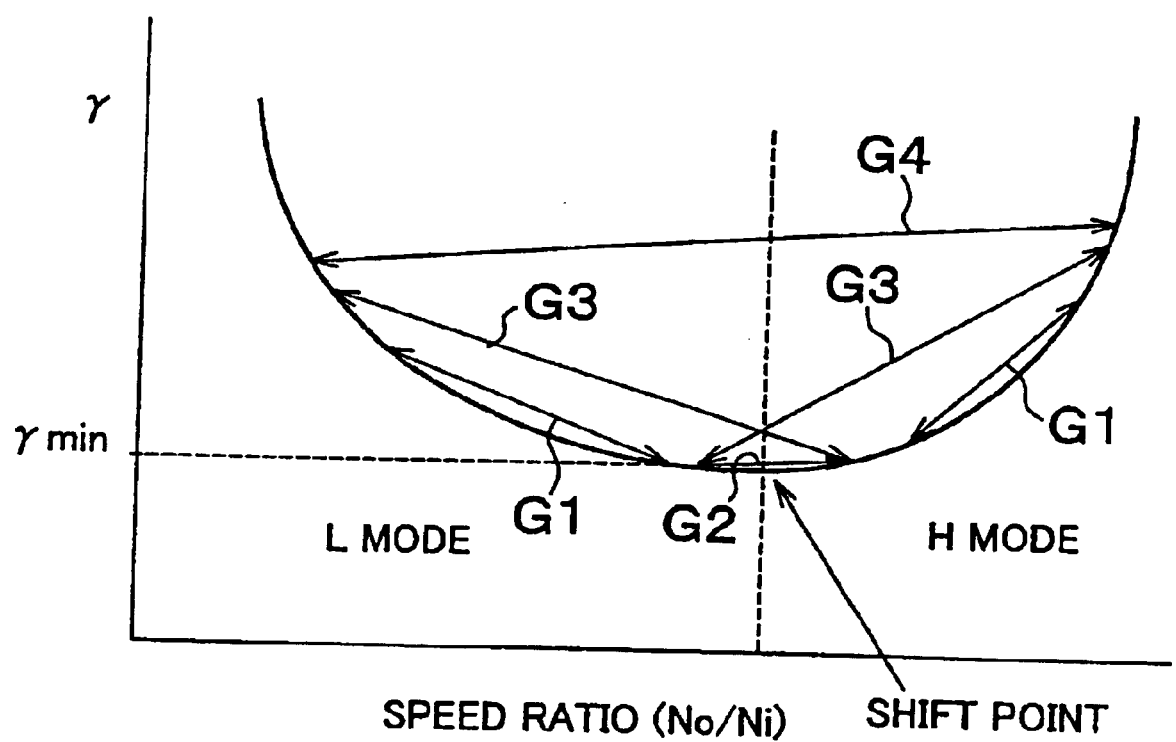
FIG. 9 is a graph showing the relation between the ratio between the input revolution speed and the output revolution speed of a transmission and the input/output revolution speed ratio of a continuously variable transmission mechanism.

FIG. 9 shows the relation between the speed ratio set by the transmission 2, that is, the ratio between the input revolution speed Ni and the output revolution speed No (No/Ni: an inverse number of the gear ratio Γ) and the input/output revolution ratio γ of the continuously variable transmission 3. Based on the running state such as vehicle speed and accelerator opening, the transmission 2 conducts shifting operation so as to achieve the engine speed of the optimum operating point corresponding to the minimum fuel consumption, while satisfying the required output. The required output is represented by a signal indicating accelerator opening, a signal from a cruise control system, and the like. The accelerator opening refers to the depressing amount of an accelerator pedal. The cruise control system is set based on the preset vehicle speed, the distance to a vehicle ahead, and the like.

The shifting operation includes the following types: shifting operation within each shift mode as shown by line G1 in FIG. 9; shifting operation across the shift point as shown by line G2 in FIG. 9, in which the input/output revolution ratio γ before and after the shifting operation is approximated to the minimum value $\gamma_{min}$; shifting operation across the shift point as shown by line G3 in FIG. 9, in which the input/output revolution ratio γ before or after the shifting operation is approximated to the minimum value $\gamma_{min}$; and shifting operation across the shift point as shown by line G4 in FIG. 9, in which the input/output revolution ratio γ before and after the shifting operation significantly deviates from the minimum value $\gamma_{min}$.

Of the above types of shifting operation, the shifting operation shown by line G1 does not involve switching of the shift mode, that is, does not involve switching of the engaged/released state of the direct-coupling clutch Cd and the coupling clutch Ch. This shifting operation is conducted by changing only the input/output revolution ratio γ of the continuously variable transmission 3. Accordingly, the gear ratio of the transmission 2 varies continuously, and will not vary in a stepwise manner. In contrast, in the other shifting operations, the engaged/released state of the direct-coupling clutch Cd and the coupling clutch Ch is switched in order to switch the shift mode. Therefore, the gear ratio may vary in a stepwise manner. In view of this, the controller according to one aspect of the invention conducts the shifting operation involving switching of the shift mode as described below.

Figure 10:
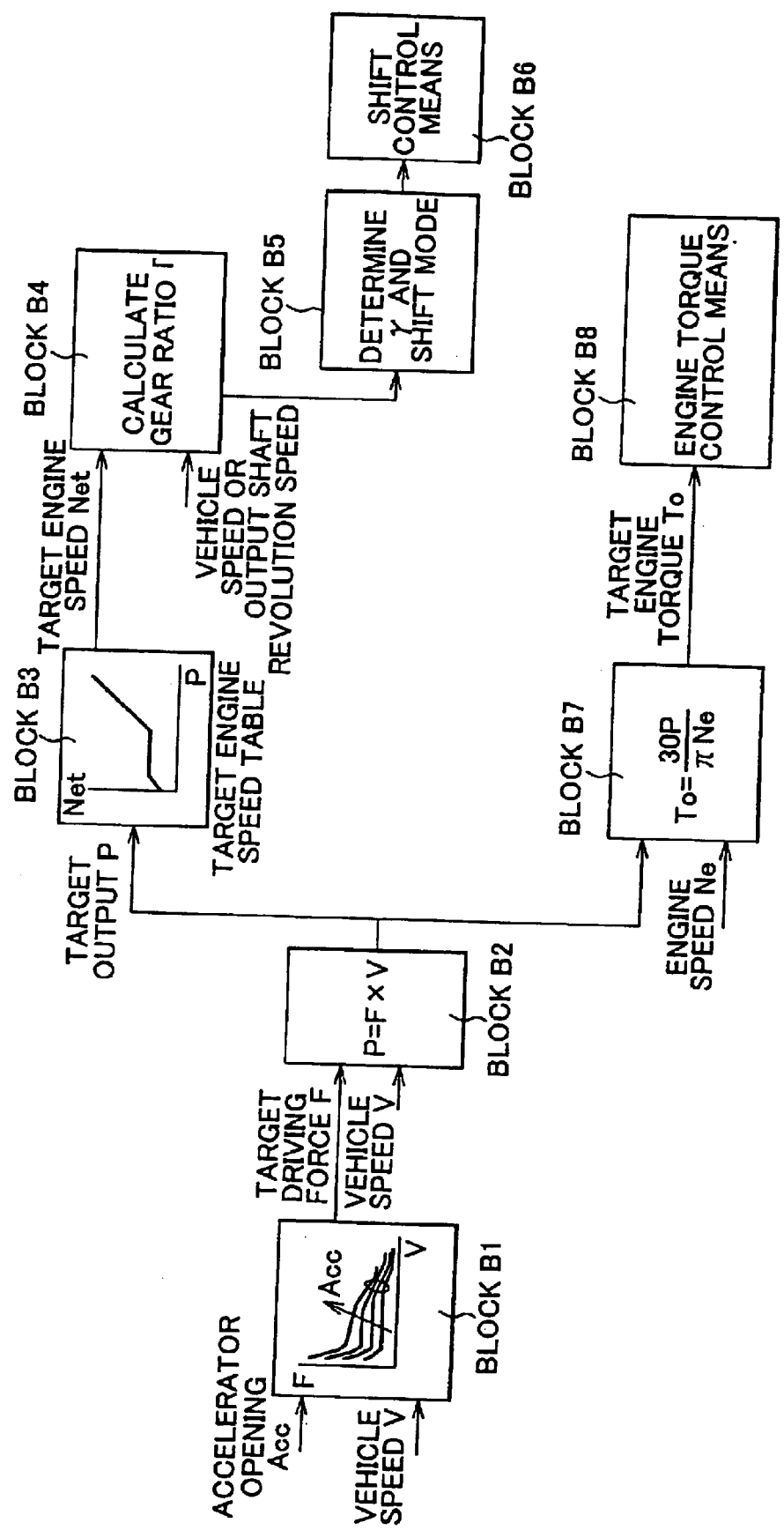
FIG. 10 is a block diagram showing an example of a control system for cooperatively controlling an engine and a transmission based on the required output.

Shifting operation of the transmission 2 is basically controlled so as to achieve the required output in a more fuel-efficient manner. More specifically, the gear ratio is controlled so as to achieve the most fuel-efficient engine speed. In this case, the load of the engine 1 is controlled to achieve the torque satisfying the required output. In other words, the engine 1 and the transmission 2 are cooperatively controlled based on the required output. FIG. 10 is a block diagram showing an example of such control. The target driving force F is obtained based on the accelerator opening Acc and the vehicle speed V (Block B1).

The accelerator opening Acc is the control data resulting from electrically processing the depressing amount of an accelerator pedal (not shown). The accelerator opening Acc is used as a parameter indicating the request for acceleration or deceleration, that is, the required output. Accordingly, a signal indicating driving request for cruise control that maintains a constant vehicle speed may be used instead of the accelerator opening Acc. The same applies to the vehicle speed. More specifically, the revolution speed of another appropriate rotating member that corresponds to the vehicle speed V on a one-to-one basis may be used instead of the vehicle speed V.

Determination of the target driving force F based on the accelerator opening Acc and the vehicle speed V is made based on a predetermined map. More specifically, the relation between the vehicle speed V and the driving force F is predetermined as a map by using the accelerator opening Acc as a parameter. In this case, the driving force F is determined so as to reflect the characteristics of a vehicle of interest. The target driving force F is thus obtained based on the map.

The target output P is obtained based on the target driving force F thus obtained in Block B1 and a current vehicle speed V (Block B2). The target output P is the product of the target driving force F and the vehicle speed V.

The target engine speed Net corresponding to the target output P is obtained in order to control the gear ratio Γ (Block B3). As described before, in the steady running state, the engine speed is controlled according to the optimum operating line (which is a set of optimum operating points), that is, the optimum fuel consumption line. Accordingly, the operating state at the target output P is located on the optimum operating line. In other words, at the target output P, the engine 1 is controlled to the state based on the optimum fuel consumption line. Therefore, the target engine speed Net is obtained by using a target engine speed table (graph) defining the output and the revolution speed based on the optimum fuel consumption line.

The gear ratio Γ to be set in the transmission 2 is calculated based on the target engine speed Net and the vehicle speed V or the revolution speed of the output shaft (Block B4). The input/output revolution ratio γ of the continuously variable transmission 3 and the shift mode are then obtained in order to set the gear ratio Γ (Block B5). More specifically, if the gear ratio Γ to be set in the transmission 2 is larger than the minimum value that can be set by the continuously variable transmission 3 alone, it is determined that L mode should be set. In contrast, if the gear ratio Γ to be set in the transmission 2 is smaller than the minimum value that can be set by the continuously variable transmission 3 alone, it is determined that H mode should be set.

A shift control means controls the direct-coupling clutch Cd and the coupling clutch Ch to set the shift mode to L mode or H mode. The input/output revolution ratio γ of the continuously variable transmission 3 is set to the target value, that is, so that the engine speed is located on the optimum fuel consumption line (Block B6). Specifically, the shift control means is the T-ECU 22 in FIG. 6.

In order to control the engine 1, the target engine torque To is obtained based on the target output P and a current engine speed Ne (Block B7). For example, the target engine torque To is obtained by dividing the target output P by the current engine speed Ne. Note that the equation shown in FIG. 10 is an equation resulting from the processing in view of the respective units of the values. Accordingly, the angular velocity of the output shaft of the engine 1 may be used instead of the engine speed Ne.

An engine torque control means controls the engine 1 so as to achieve the target engine torque To thus obtained (Block B8). More specifically, the T-ECU 22 of FIG. 6 controls the fuel injection amount or the opening of an electronic throttle valve.

As described above, the controller according to one aspect of the invention controls the gear ratio Γ of the transmission 2, that is, the shift mode and the input/output revolution ratio γ of the continuously variable transmission 3, based on the required output. At the same time, the controller controls the load of the engine 1. Such shift control in so-called cooperative control of the engine 1 and the transmission 2 will now be described in more detail.

FIG. 1 is a flowchart illustrating the overall flow of the control. First, the vehicle speed V and the accelerator opening Acc indicating the required output are detected (Step S1). The target output shaft torque To is obtained based on the vehicle speed V and the accelerator opening Acc (Step S2). This corresponds to the control in Block B1 of FIG. 10.

The operating point of the engine 1 (E/G), that is, the target engine speed and the target torque, is determined based on the vehicle speed V and the accelerator opening Acc (Step S3). The gear ratio Γ of the transmission 2 (TM) is determined based on the target engine speed (Step S4). The shift mode and the input/output revolution ratio γ of the continuously variable transmission 3 are determined based on the gear ratio Γ (Step S5). The control of Steps S3 to S5 corresponds to the control in Blocks B3, B4 and B5 in FIG. 10.

Thereafter, the load of the engine 1 is controlled so that output torque Te reaches the target torque (Step S6). More specifically, the throttle opening is controlled.

Regarding the control of the transmission 2, whether the shift mode is to be switched or not is determined (Step S7). More specifically, if the shift mode determined in Step S5 is different from the actual shift mode, it is determined that the shift mode is to be switched. In contrast, if the shift mode determined in Step S5 is the same as the actual shift mode, it is determined that the shift mode is not to be switched.

If NO in Step S7, that is, if it is determined that the shift mode need not be switched in order to achieve the gear ratio $\Gamma$ determined in Step S4, only the input/output revolution ratio $\gamma$ of the continuously variable transmission 3 is varied so as to achieve the gear ratio $\Gamma$ (Step S8). This control is conducted in the same manner whether the actual shift mode is L mode or H mode.

If YES in Step S7, that is, if it is determined that the shift mode must be switched in order to achieve the gear ratio $\Gamma$ determined in Step S4, the input/output revolution ratio $\gamma$ of the continuously variable transmission 3 is varied toward the value suitable for switching the shift mode, that is, toward the minimum value $\gamma_{min}$ (Step S9). For example, when the shift mode is to be switched from L mode to H mode, working fluid is supplied to the actuator 8 of the driving pulley 7 in FIG. 6 so as to reduce the groove width of the driving pulley 7 and thus increase the groove width of the driven pulley 9.

The input/output revolution ratio $\gamma$ of the continuously variable transmission 3 is obtained by detecting the respective revolution speeds of the driving pulley 7 and the driven pulley 9 and calculating the ratio therebetween. Whether the input/output revolution ratio $\gamma$ becomes close to the minimum value $\gamma_{min}$ or not is then determined (Step S10). As described before, in the transmission 2 of FIG. 6, it is desirable to switch the shift mode when the input/output revolution ratio $\gamma$ of the continuously variable transmission 3 becomes close to the minimum value $\gamma_{min}$. This is because switching the shift mode by changing the engaged/released state of the direct-coupling clutch Cd and the coupling clutch Ch at the minimum input/output revolution ratio $\gamma_{min}$ of the continuously variable transmission 3 will not cause any rotational fluctuation, change in output shaft torque and the like. If NO in Step S10, the routine returns without any particular control. If YES in Step S10, mode switching control (sequence) is started (Step S11). The mode switching control will be described later.

Thereafter, whether the switch sequence is completed or not is determined (Step S12). If YES in Step S12, the timing of starting the shift-mode switching control is corrected by learning (Step S13). The learning correction will be described later.

Note that, although not shown in FIG. 1, after the shift mode is switched as described above, the input/output revolution ratio $\gamma$ of the continuously variable transmission 3 is gradually increased from the minimum value $\gamma_{min}$ to the value determined in Step S5. Operation of varying the gear ratio $\Gamma$, i.e., shifting operation, that involves switching of the shift mode is thus completed.

Figure 2:
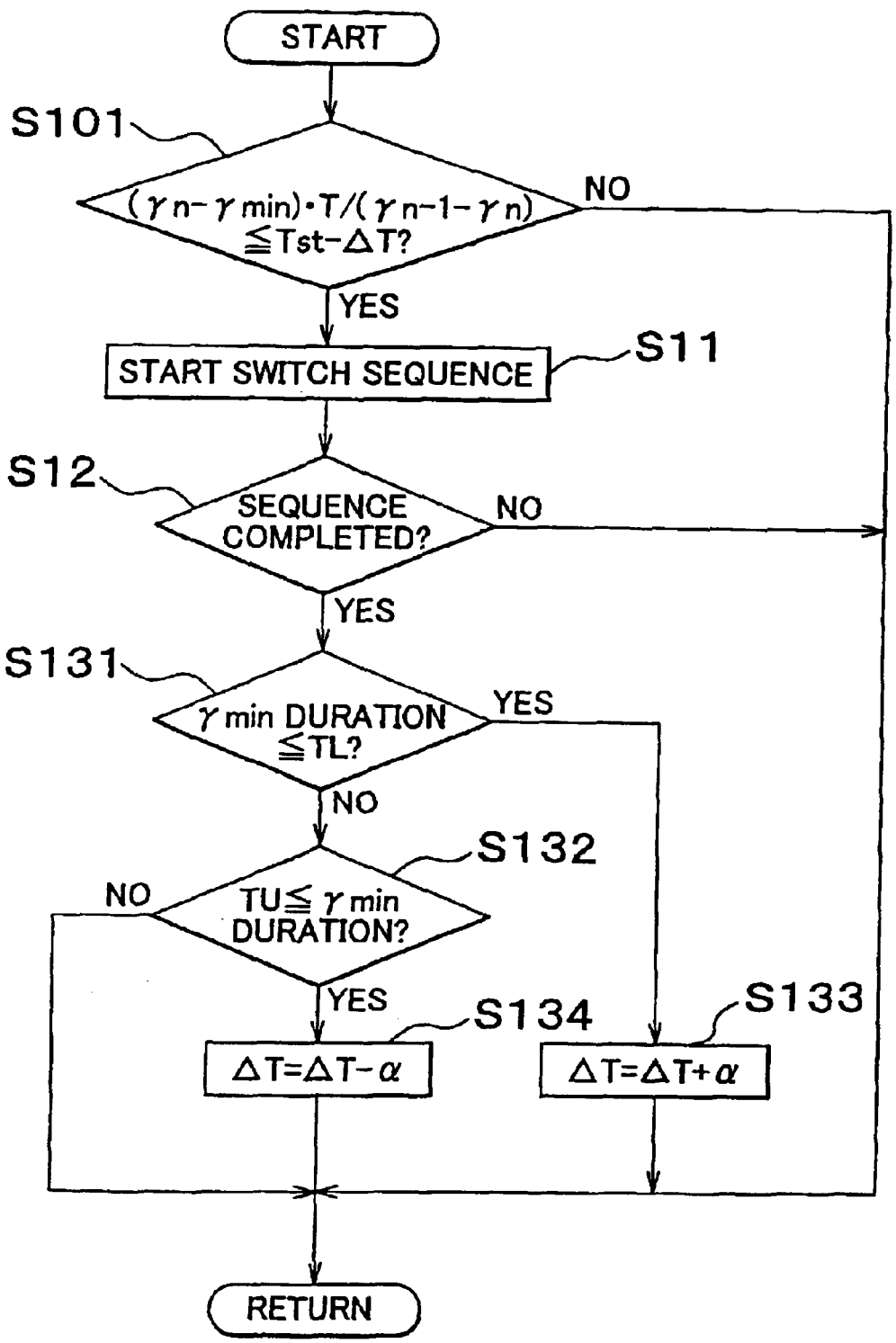
FIG. 2 is a flowchart illustrating an example of the learning control of the timing of switching the shift mode.

FIG. 2 is a flowchart specifically illustrating the control in Steps S10 to S13. After the input/output revolution ratio $\gamma$ of the continuously variable transmission 3 is varied toward the minimum value $\gamma_{min}$, whether the input/output revolution ratio $\gamma$ becomes close to the minimum value $\gamma_{min}$ or not is determined. This determination is made by the operation of FIG. 2 (Step S101). More specifically, it is determined that whether or not the product of the difference between the actual input/output revolution ratio $\gamma_n$ and the minimum value $\gamma_{min}$ ($\gamma_n - \gamma_{min}$) and the monitoring interval T of the input/output revolution ratio $\gamma_n$ (i.e., the time interval between the previous monitoring and the current monitoring), ($\gamma_n - \gamma_{min}$)·T, divided by a variation in the input/output revolution ratio $\gamma$ during the time interval T, ($\gamma_{n-1} - \gamma_n$), is equal to or smaller than a prescribed value (Tst−$\Delta$T).

Tst is the stroke time of a clutch that is engaged to switch the shift mode. In other words, Tst is the time from when supply of the hydraulic pressure for operating the clutch is started until pack clearance is eliminated and the torque is actually transmitted, that is, until the clutch starts having the torque capacity. This time corresponds to the substantial time to switch the shift mode. This value can be obtained in advance by experimentation or the like. $\Delta$T is a value that is corrected by learning, and may either be a positive value or a negative value.

Consequently, in Step S101, the time for the input/output revolution ratio $\gamma$ of the continuously variable transmission 3 to reach the minimum value $\gamma_{min}$ is estimated, and whether or not the estimated time is equal to or less than the time required to engage the engaging clutch is determined. If NO in Step S101, the input/output revolution ratio $\gamma$ of the continuously variable transmission 3 is not close to the minimum value $\gamma_{min}$. Therefore, the routine returns without particular control. If YES in Step S101, the switch sequence is started (Step S11).

The switch sequence includes the following two controls. One of the controls is control of the standby state. In the case where the direct-coupling clutch Cd and the couple clutch Ch is a hydraulic multiple-disc clutch, the standby state is the state right before engaging the clutch, in which the hydraulic pressure for engaging is increased and the torque starts having the torque capacity. The other control is control from the time when the clutch actually starts engaging after the control of the standby state until the clutch is completely engaged. For example, each control in the switching sequence may be conducted based on a timer. Accordingly, determination that the sequence is completed (Step S12) can be made when the counting of the timer is completed.

As shown in Step S102 of FIG. 2, the switch sequence is started when the estimated time for the input/output revolution speed $\gamma$ of the continuously variable transmission 3 to reach the minimum value $\gamma_{min}$ matches the stroke time of the hydraulic piston in the engaging clutch minus $\Delta$T. Accordingly, the switch sequence is completed after the input/output revolution ratio $\gamma$ of the continuously variable transmission 3 reaches the minimum value $\gamma_{min}$. In other words, in the process of switching the shift mode, the input/output revolution ratio $\gamma$ of the continuously variable transmission 3 is held at the minimum value $\gamma_{min}$ for a prescribed time.

The $\gamma_{min}$ duration is then detected. The $\gamma_{min}$ duration is a time period from when the input/output revolution ratio $\gamma$ calculated based on the respective revolution speeds of the driving pulley 7 and the driven pulley 9 obtained by a revolution speed sensor reaches the minimum value $\gamma$ until the engaging clutch starts having the torque capacity after the so-called standby state. Whether or not the $\gamma_{min}$ duration is equal to or less than a predetermined lower limit TL is then determined (Step S131). If NO in Step S131, whether or not the $\gamma_{min}$ duration is equal to or larger than a predetermined upper limit TU is determined (Step S132).

If NO in Step S132, the $\gamma_{min}$ duration is within a prescribed range defined by the lower limit TL and the upper limit TU. Therefore, it is determined that the timing of substantially starting the shift-mode switching control is proper. In this case, the learning correction value ΔT is not changed.

If YES in Step S131, the timing when the engaging clutch substantially starts engaging is too early. In this case, the learning correction value ΔT is changed to the sum of the learning correction value ΔT and a predetermined value β (Step S133). This means that the reference value for determination in Step S101 (Tst−ΔT) is reduced. Therefore, the shift-mode switch sequence will not be started until the input/output revolution ratio γ of the continuously variable transmission 3 becomes very close to the minimum value γ. This prevents the shift mode from being switched before the input/output revolution ratio γ of the continuously variable transmission 3 reaches the value suitable for switching the shift mode, and thus prevents shocks from being generated.

If YES in Step S132, the timing when the engaging clutch substantially starts engaging is late. In this case, the learning correction value ΔT is changed to the learning correction value ΔT minus a predetermined value β (Step S134). This means that the reference value for determination in Step S101 (Tst−ΔT) is increased. Therefore, the shift-mode switch sequence will be started before the input/output revolution ratio γ of the continuously variable transmission 3 becomes very close to the minimum value γ. This prevents the input/output revolution ratio γ of the continuously variable transmission 3 from being held at the minimum value $\gamma_{min}$ suitable for switching the shift mode for an excessively long time, and also prevents the driver from having a feeling of shift delay. Alternatively, this prevents the operating point of the engine 1 from significantly deviating from the optimum fuel consumption line, and also prevents generation of rotational fluctuation upon restoring the input revolution speed to the target value and thus generation of inertial torque. Therefore, shocks can be prevented from being generated due to such rotational fluctuation and inertial torque.

Figure 3:
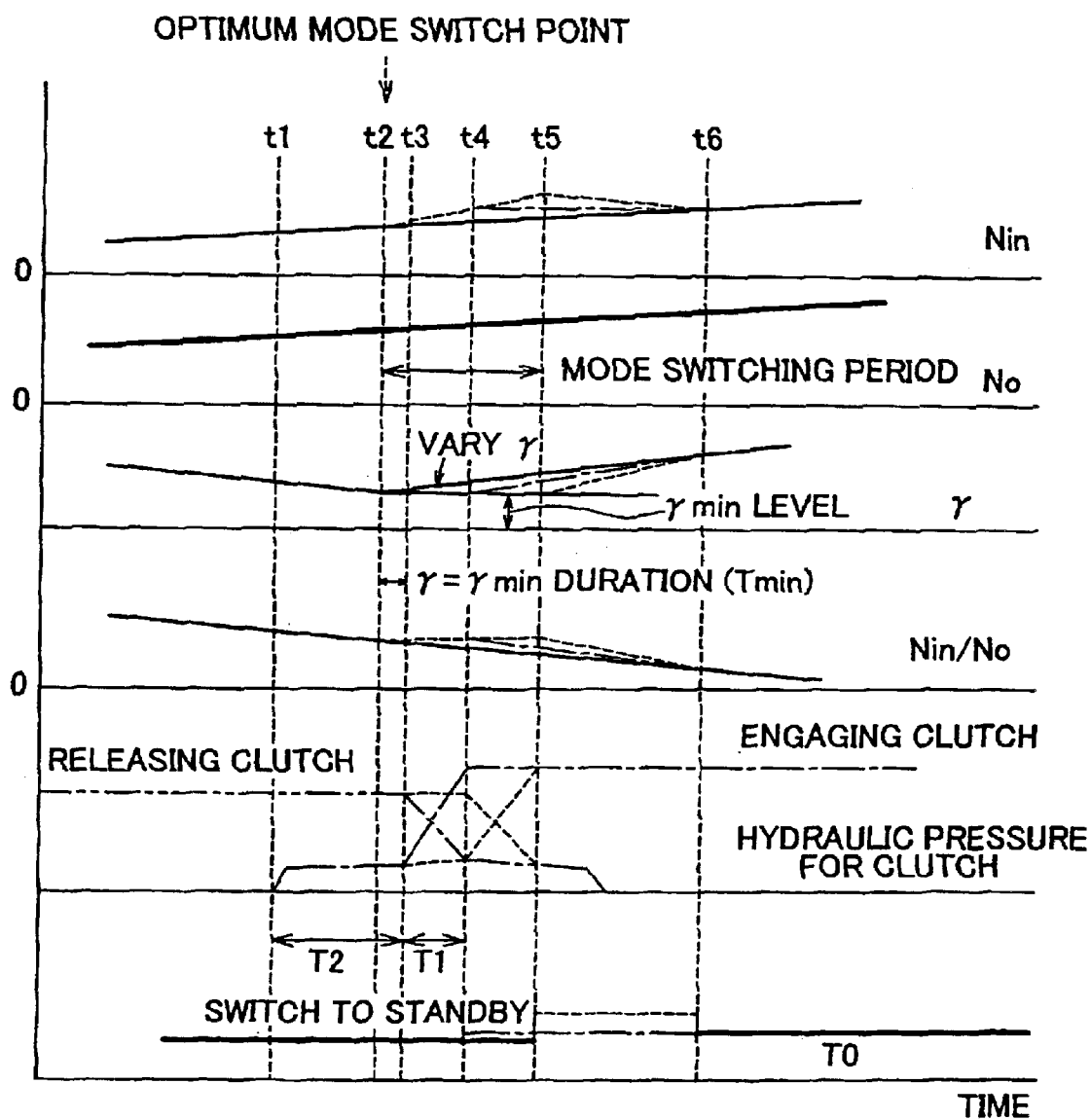
FIG. 3 is a timing chart illustrating an example of the change of a transmission when the control of FIG. 1 is conducted.

FIG. 3 exemplarily shows a change in input revolution speed Nin, output revolution speed No, input/output revolution ratio γ, gear ratio (Nin/No=Γ), clutch hydraulic pressure for operating a clutch, and output shaft torque To. In FIG. 3, it is assumed that the vehicle speed is increased with constant accelerator opening and the above control is conducted during the shifting operation that involves switching of the shift mode. The output revolution speed No of the transmission 2 gradually increases with increase in vehicle speed V. The gear ratio Γ is thus gradually reduced in order to hold the operating point of the engine 1 on the optimum fuel consumption line. Since the shift mode is L mode, the gear ratio Γ is reduced by reducing the input/output revolution ratio γ of the continuously variable transmission 3.

In this process, the target shift mode is determined, and the continuously variable transmission 3 is controlled toward the input/output revolution ratio $\gamma_{min}$ suitable for shifting the shift mode. Provided that the condition of Step 101 in FIG. 2 is satisfied at time t1 in FIG. 3, the switch sequence is started. First, a hydraulic pressure for engaging of the engaging clutch (in this case, the coupling clutch Ch that is engaged in H mode) starts being increased. Then, the engaging clutch is rendered in the standby state near the end of a predetermined time period T2. Note that the standby state is the state right before the coupling clutch is engaged with its pack clearance being eliminated. Therefore, by further increasing the engaging hydraulic pressure, the clutch would start having the substantial torque capacity. At time t2 in the standby state, the input/output revolution ratio γ of the continuously variable transmission 3 reaches the minimum value $\gamma_{min}$, and the standby state is maintained.

The standby period T2 ends at time t3. At time t3, the hydraulic pressure for engaging the engaging clutch, i.e., the coupling clutch Ch, is further increased, so that the coupling clutch Ch starts being engaged. In addition, the engaging hydraulic pressure is discharged from the releasing clutch (in this case, the direct-coupling clutch Cd). At time t4, that is, after a predetermined time period T1 from time t3, the engaging clutch, that is, the coupling clutch Ch, is completely engaged, and the shift mode is switched to H mode. The time period T1 from when the coupling clutch Ch substantially starts having the torque capacity until it is completely engaged is set so as to suppress or prevent problems such as pulsation due to abrupt change in hydraulic pressure.

After time t4 when the shift mode is substantially switched to H mode, the input/output revolution ratio γ of the continuously variable transmission 3 is gradually increased so that the engine speed reaches the target value. At time t6, the input revolution speed Nin reaches the target value. Shifting operation involving switching of the shift mode is thus completed.

Accordingly, in the above shifting process, the input/output revolution ratio γ of the continuously variable transmission 3 is held at the minimum value $\gamma_{min}$ during the period from time t2 to time t4. The vehicle speed and thus the output revolution speed No increase during this period as well. Therefore, the engine speed, that is, the input revolution speed Nin, increases away from the target value (solid line), as shown by the chain line in FIG. 3. This means that the operating point of the engine 1 deviates from the optimum fuel efficient line.

However, the controller of the invention corrects the timing of starting the switch sequence by learning so that the $\gamma_{min}$ duration, i.e., the period from time t2 to time t3, is within the range defined by the lower limit TL and the upper limit TU. As a result, the $\gamma_{min}$ duration is reduced as much as possible. This prevents the input revolution speed Nin from significantly deviating from the target value, that is, prevents the operating point of the engine 1 from significantly deviating from the optimum fuel consumption line. Therefore, degradation in fuel consumption can be prevented or suppressed.

As shown by the chain line in FIG. 3, the output shaft torque To varies only slightly. Therefore, shock generation and degradation in drivability can be prevented or suppressed. Moreover, only slight rotational fluctuation occurs when the actual input revolution speed Nin is controlled to the target value. Therefore, inertial force and shocks or vibration resulting from the inertial force is prevented or suppressed. In this respect as well, degradation in drivability can be prevented.

Note that, in the above control, the shift-mode switching control is conducted at the minimum input/output revolution ratio $\gamma_{min}$. Therefore, variation in output shaft torque To resulting from simultaneously switching the engaged/released state of the direct-coupling clutch Cd and the coupling clutch Ch as well as shock generation resulting from such variation are prevented.

The change shown by the dashed line in FIG. 3 results from starting switching of the shift mode after confirming that the input/output revolution ratio γ reached the minimum value $\gamma_{min}$ suitable for switching the shift mode. In such control, the minimum input/output revolution ratio γ is held at the minimum value $\gamma_{min}$ until time t5 that is later than time t4. This increases the $\gamma_{min}$ duration and thus increases deviation of the input revolution speed Nin from the target value. As a result, the operating point of the engine 1 significantly deviates from the optimum fuel consumption line, degrading the fuel consumption. Moreover, rotational fluctuation resulting from controlling the input revolution speed Nin to the target value and thus the inertial torque resulting from such fluctuation are increased, whereby shocks may possibly be generated.

The control shown in FIGS. 2 and 3 is effective when the hydraulic pressure of the direct-coupling clutch Cd and the coupling clutch Ch can be directly controlled by, e.g., a linear solenoid valve (not shown) and the like in an accurate manner. This control can be similarly applied to a transmission that adjusts a hydraulic pressure for engaging the direct-coupling clutch Cd and the coupling clutch Ch or a hydraulic pressure for releasing them by means of an orifice and an accumulator (both of which are not shown). In other words, the timing of starting supply and discharge of the hydraulic pressures for engaging and releasing the direct-coupling clutch Cd and the coupling clutch Ch is controlled based on an instruction given by the T-ECU 22 during the shift-mode switch sequence. It is therefore effective to correct the timing of starting supply and discharge of the hydraulic pressures for engaging and releasing the direct-coupling clutch Cd and the coupling clutch Ch, based on the $\gamma_{min}$ duration, that is, a period set by subtracting preset operating time of the accumulator from the preset maximum time to complete the switching operation. In the former case, control of FIG. 4 is also possible.

Figure 4:
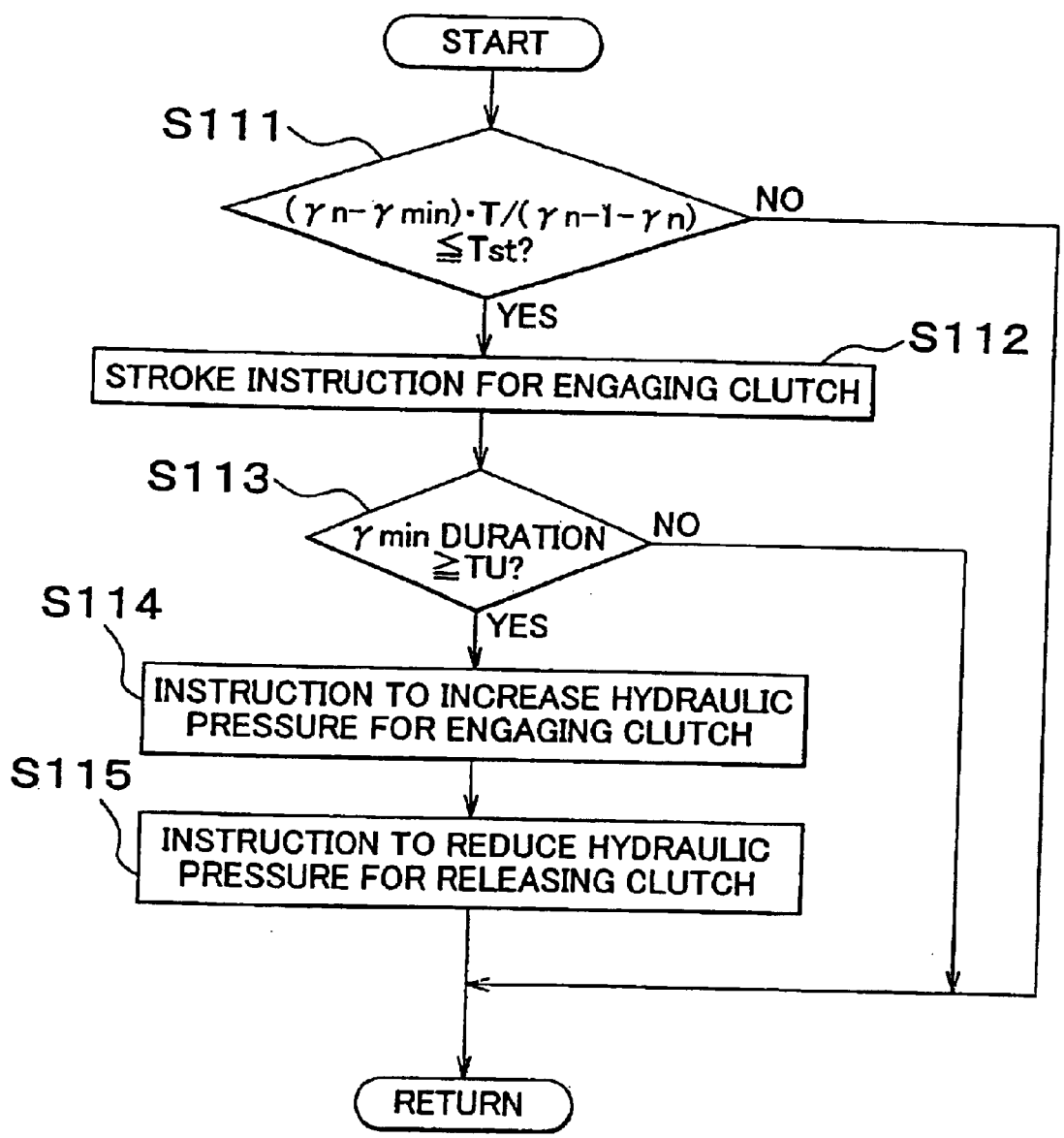
FIG. 4 is a flowchart illustrating another example of the shift-mode switching control.

The control example of FIG. 4 is conducted instead of Steps S10 to S12 of FIG. 1. This control does not include learning control. First, while the input/output revolution ratio γ of the continuously variable transmission 3 is being changed toward the minimum value $\gamma_{min}$ suitable for switching the shift mode, the time for the input/output revolution ratio γ to reach the minimum value $\gamma_{min}$ is estimated. This estimation can be conducted in the same manner as that of Step S101 in FIG. 2. Whether or not the estimated time is equal to or less than the time Tst corresponding to the piston stroke time of the engaging clutch is determined (Step S111).

If NO in Step S111, the routine returns without particular control. If YES in Step S111, a stroke instruction for the engaging clutch (in the illustrated example, the coupling clutch Ch that is engaged in H mode) is output (Step S112). According to this instruction, the hydraulic pressure is supplied to the coupling clutch Ch so as to move the piston forward against the mounting load of a return spring (not shown) and the like, and to hold the coupling clutch Ch in the state right before it starts having substantial torque capacity (standby state). This control is conducted by increasing the hydraulic pressure to a predetermined value required for engaging the clutch. Note that the hydraulic pressure is directly controlled by a linear solenoid value and the like.

In parallel with the above process, the input/output revolution ratio γ is detected (monitored). After the input/output revolution ratio γ reaches the minimum value $\gamma_{min}$, whether or not the $\gamma_{min}$ duration is equal to or larger than a predetermined upper limit TU is determined (Step S113). In order to prevent erroneous determination, it is preferable to determine whether the input/output revolution ratio γ reaches the minimum value $\gamma_{min}$ or not by reading the value twice, e.g., detecting a signal from the revolution speed sensor twice. The upper limit TU can be set as the minimum time period required to confirm the determination that the input/output revolution ratio γ reached the minimum value $\gamma_{min}$.

If NO in Step S113, the routine returns without particular control. If YES in Step S113, an instruction to increase the hydraulic pressure for engaging the engaging clutch, that is, the coupling clutch Ch, is output (Step S114). Moreover, an instruction to reduce the hydraulic pressure for engaging the releasing clutch (in the illustrated example, the direct-coupling clutch Cd) is output (Step S115). In other words, in order to switch the shift mode from L mode to H mode, the engaging hydraulic pressure is increased so as to substantially engaging the coupling clutch Ch, and at the same time, the hydraulic pressure is reduced so as to release the direct-coupling clutch Cd. These hydraulic pressures are directly controlled by, e.g., a linear solenoid value and the like. The tendency (gradient) of change in these hydraulic pressures is set so that the hydraulic pressures change as soon as possible within the range that does not cause pulsation due to abrupt change in hydraulic pressure. For example, the gradient may be approximated to that in the case where the hydraulic pressures are controlled by mean of the orifice and the accumulator as described in the control example of FIGS. 2 and 3.

Figure 5:
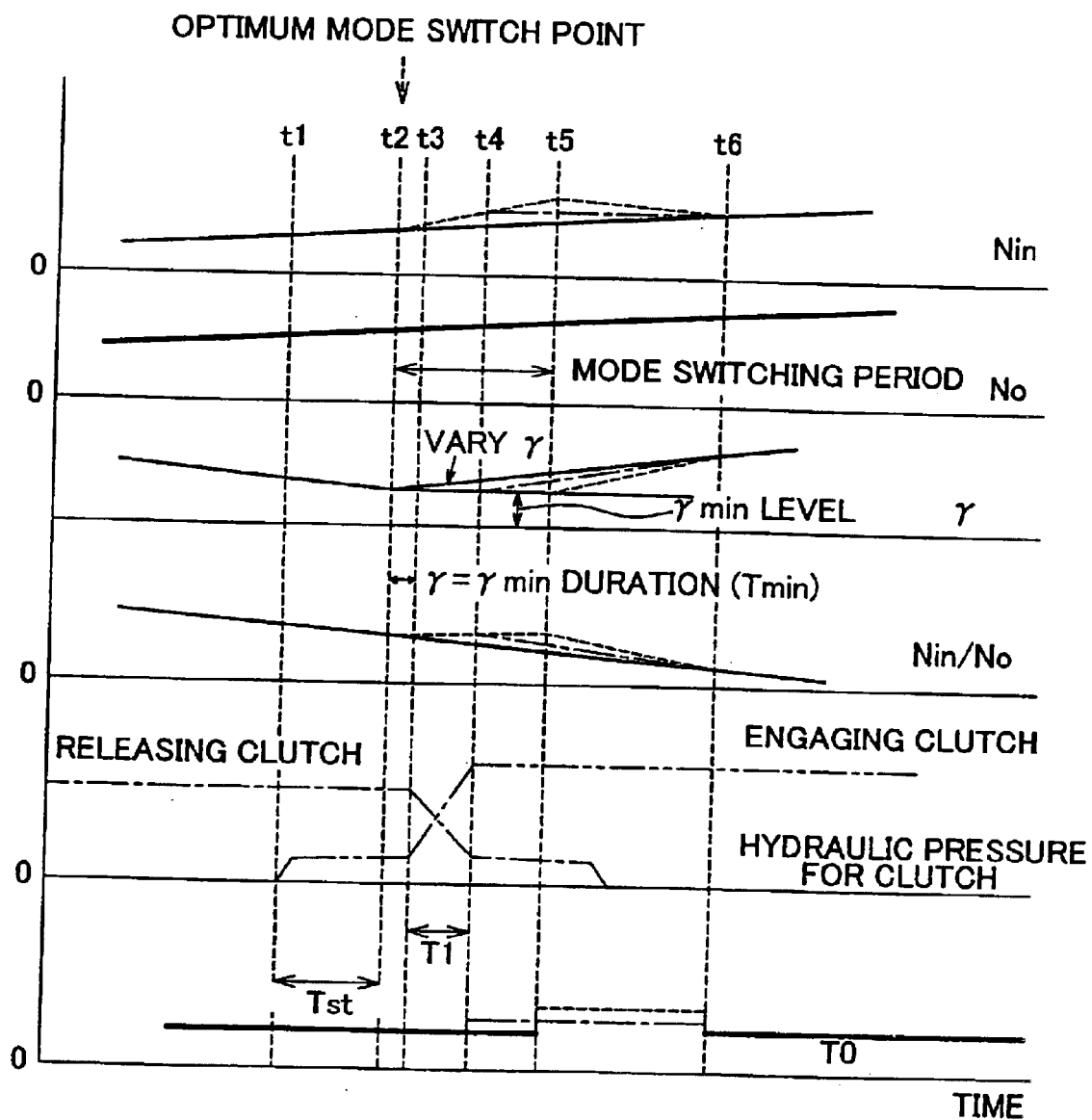
FIG. 5 is a timing chart illustrating an example of the change of a transmission when the control of FIG. 4 is conducted.

FIG. 5 shows an example of the control of FIG. 4. In this example, the shift mode is switched from L mode to H mode, and at the same time, the gear ratio is varied when the vehicle speed increases with constant acceleration opening. The chain line in FIG. 5 indicates a change resulting from the above control. The solid line in FIG. 5 indicates the target value or an ideal change. The dashed line in FIG. 5 indicates a change in the control other than the control according to one aspect of the invention. As described above, in the control according to one aspect of the invention, the timing when the input/output revolution ratio γ reaches the minimum value $\gamma_{min}$ within the piston stroke time Tst is detected, and a hydraulic pressure for engaging the engaging clutch starts being increased. In this state, it is confirmed that the input/output revolution ratio γ reached the minimum value $\gamma_{min}$. At time t3 when the $\gamma_{min}$ duration reaches the upper limit TU, the hydraulic pressure for engaging the engaging clutch is increased, and the hydraulic pressure is discharged from the releasing clutch.

Accordingly, the shift-mode switching by changing the engaged/released state of the direct-coupling clutch Cd and the coupling clutch Ch is conducted at the minimum input/output revolution ratio $\gamma_{min}$ of the continuously variable transmission 3. This prevents the gear ratio from changing soon after switching the engaged/released state of each clutch like so-called clutch-to-clutch shift operation. Moreover, the time period from time t2 when the input/output revolution ratio γ of the continuously variable transmission 3 reaches the minimum value $\gamma_{min}$ suitable for switching the shift mode to time t3 when the shift mode is substantially switched, that is, the $\gamma_{min}$ duration, can be reduced. This reduces deviation of the input revolution speed Nin from the target value and thus reduces deviation of the operating point of the engine from the optimum fuel consumption line. As a result, degradation in fuel consumption can be prevented or suppressed, and also shift shock as well as shift delay can be avoided.

Thus, the power engine and the transmission including the continuously variable transmission coupled to the output of the power engine are controlled so as to satisfy the required output and to reduce the fuel consumption. As a result, drivability and fuel consumption can be improved. Moreover, the overall gear ratio of the transmission varies as continuously as possible, so that the intrinsic characteristics of the continuously variable transmission can be effectively obtained. Therefore, drivability and fuel consumption can be improved.

The correspondence between the above specific example and the invention will now be described briefly. The functional means of Step S6 in FIG. 1 and the functional means of Block B8 in FIG. 10 correspond to the power engine control means according to one aspect of the invention. The functional means of Step S5 in FIG. 1 and the functional means of Block B5 in FIG. 10 correspond to the input/output revolution ratio calculating means (S5) according to one aspect of the invention. The functional means of Step S5 in FIG. 1 and the functional means of Block B5 in FIG. 10 correspond to the shift-mode determining means according to one aspect of the invention.

Note that the transmission capable of setting two transmission modes, L mode and H mode, is described in the above specific example. However, the invention is not limited to such a specific example. And the internal combustion engine is adopted as a power plant in the above specific example. However, the invention is not limited to such a specific example. The invention is also applicable to a controller for a transmission capable of setting three or more shift modes. The only requirement for the transmission applied to the invention is the capability to set a plurality of shift modes by a continuously variable transmission and a gearshift mechanism, and the invention is not limited to the structure of the transmission of FIG. 6.

What is claimed is:

1. A controller including an internal combustion engine and a continuously variable transmission, wherein a transmission coupled to an output of the internal combustion engine includes the continuously variable transmission and a gearshift mechanism, and the controller is capable of selectively setting a first shift mode in which a gear ratio increases with increase in an input/output revolution ratio, that is, a ratio between an input revolution speed and an output revolution speed of the continuously variable transmission, and a second shift mode in which the gear ratio decreases with increase in the input/output revolution ratio, the controller comprising:

an internal combustion engine control means for obtaining target torque based on control data including a required output, and controlling load of the internal combustion engine so as to achieve the target torque;

an input/output revolution ratio calculating means for obtaining a target input revolution speed based on the control data and calculating the input/output revolution ratio of the continuously variable transmission so as to achieve the target input revolution speed; and a shift-mode determining means for determining a shift mode to be set from the first shift mode and the second shift mode based on the input/output revolution ratio calculated by the input/output revolution ratio calculating means.

2. The controller according to claim 1, wherein an input shaft of the continuously variable transmission is coupled to an output shaft of the internal combustion engine, the gearshift mechanism is a planetary gear mechanism, a sun gear of the planetary gear mechanism is engaged so as to rotate in a direction opposite to that of an output shaft of the continuously variable transmission, a carrier of the planetary gear mechanism is capable of being selectively engaged or released so as to rotate in a direction opposite to that of the output shaft of the internal combustion engine, the sun gear and a ring gear are capable of being selectively integrated or disengaged, the first shift mode is set by releasing the carrier and the output shaft of the internal combustion engine and integrating the sun gear and the ring gear, and the second shift mode that defines a range of the gear ratio that is different from that of the first shift mode is set by disengaging the sun gear and the ring gear and engaging the carrier and the output shaft of the internal combustion engine.

3. The controller according to claim 1, characterized in that wherein the shift mode is switched when the input/output revolution ratio calculated by the input/output revolution ratio calculating means is within the range of the gear ratio defined by a shift mode other than a current shift mode.

4. The controller according to claim 1, further comprising a continuously variable transmission control means for switching the shift mode and setting the calculated input/output revolution ratio after varying a current input/output revolution ratio to a predetermined value suitable for switching the shift mode.

5. The controller according to claim 4, wherein the continuously variable transmission control means controls the gear ratio so as to achieve a most efficient revolution speed of the internal combustion engine, and the internal combustion engine control means controls the internal combustion engine so that the internal combustion engine generates torque according to the required output.

6. The controller according to claim 4, further comprising:

estimating means for estimating time for the input/output revolution ratio to reach the predetermined value when varying the input/output revolution ratio while involving switching of the shift mode; and a shift-mode switching control means for determining timing of starting shift-mode switching control based on the time estimated by the estimating means.

7. The controller according to claim 6, wherein the estimating means estimates the time for the input/output revolution ratio to reach the predetermined value based on a variation per unit time in the input/output revolution ratio.

8. The controller according to claim 7, wherein the shift-mode switching control means integrates or disengages the sun gear and the ring gear, and engages or releases the carrier and the output shaft of the internal combustion engine based on the time estimated by the estimating means.

9. The controller according to claim 6, further comprising:

a revolution sensor for detecting an input revolution speed and an output revolution speed of the continuously variable transmission; and a timer for measuring a time interval for detecting the revolution speeds, wherein;

when the following equation is satisfied, it is determined that the switching control is to be started:

$$(\gamma_n - \gamma_{min}) \cdot T / (\gamma_{n-1} - \gamma_n) \leq Tst$$

where T is the time interval, $\gamma_{n-1}$ and $\gamma_n$ are the input/output revolution ratio calculated from the revolution speeds detected at the time interval T, $\gamma_{min}$ is the predetermined input/output revolution ratio, and Tst is time required to switch the shift mode.

10. The controller according to claim 4, further comprising a shift-mode switching control means for changing the timing of substantially starting the shift-mode switching control based on duration of the predetermined input/output revolution ratio in a process of varying the input/output revolution ratio while involving switching of the shift mode.

11. The controller according to claim 10, wherein the duration of the predetermined input/output revolution ratio is corrected based on past operation record of the duration.

12. The controller according to claim 10, further comprising:
a revolution sensor for measuring an input revolution speed and an output revolution speed of the continuously variable transmission; and
a timer for measuring a time interval for detecting the revolution speeds,
wherein
when the following equation is satisfied, it is determined that the switching control is to be started:

$$(\gamma_n - \gamma_{min}) \Box T/(\gamma_{n-1} - \gamma_n) \leq Tst - \Delta T$$

where T is the time interval,
$\gamma_{n-1}$ and $\gamma_n$ are the input/output revolution ratio calculated from the revolution speeds detected at the time interval T,
$\gamma_{min}$ is the predetermined input/output revolution ratio,
Tst is time required to switch the shift mode, and
$\Delta T$ is a correction value based on the past operation record of the duration.

13. A controller including a power engine and a continuously variable transmission, wherein a transmission coupled to an output of the power engine includes the continuously variable transmission and a gearshift mechanism, and the controller is capable of selectively setting a first shift mode in which a gear ratio increases with increase in an input/output revolution ratio, that is, a ratio between an input revolution speed and an output revolution speed of the continuously variable transmission, and a second shift mode in which the gear ratio decreases with increase in the input/output revolution ratio, the controller comprising: a power engine control means for obtaining target torque based on control data including a required output, and controlling load of the power engine so as to achieve the target torque;
an input/output revolution ratio calculating means for obtaining a target input revolution speed based on the control data and calculating the input/output revolution ratio of the continuously variable transmission so as to achieve the target input revolution speed; and
a shift-mode determining means for determining a shift mode to be set from the first shift mode and the second shift mode based on the input/output revolution ratio calculated by the input/output revolution ratio calculating means.

14. A control method of a controller including an internal combustion engine and a continuously variable transmission, wherein a transmission coupled to an output of the internal combustion engine includes the continuously variable transmission and a gearshift mechanism, the controller is capable of selectively setting a first shift mode in which a gear ratio increases with increase in an input/output revolution ratio, that is, a ratio between an input revolution speed and an output revolution speed of the continuously variable transmission, and a second shift mode in which the gear ratio decreases with increase in the input/output revolution ratio, the control method comprising the steps of:
obtaining target torque based on control data including a required output, and controlling load of the internal combustion engine so as to achieve the target torque;
obtaining a target input revolution speed based on the control data and calculating the input/output revolution ratio of the continuously variable transmission so as to achieve the target input revolution speed; and
determining a shift mode to be set from the first shift mode and the second shift mode based on the calculated input/output revolution ratio.

15. The control method according to claim 14, wherein an input shaft of the continuously variable transmission is coupled to an output shaft of the internal combustion engine, the gearshift mechanism is a planetary gear mechanism, a sun gear of the planetary gear mechanism is engaged so as to rotate in a direction opposite to that of an output shaft of the continuously variable transmission, a carrier of the planetary gear mechanism is capable of being selectively engaged or released so as to rotate in a direction opposite to that of the output shaft of the internal combustion engine, the sun gear and a ring gear are capable of being selectively integrated or disengaged, the first shift mode is set by releasing the carrier and the output shaft of the internal combustion engine and integrating the sun gear and the ring gear, and the second shift mode that defines a range of the gear ratio that is different from that of the first shift mode is set by disengaging the sun gear and the ring gear and engaging the carrier and the output shaft of the internal combustion engine.

16. The control method according to claim 14, wherein the shift mode is switched when the input/output revolution ratio calculated by the input/output revolution ratio calculating means is within the range of the gear ratio defined by a shift mode other than a current shift mode.

17. The control method according to claim 14, wherein the shift mode is switched, and the calculated input/output revolution ratio is set after a current input/output revolution ratio is varied to a predetermined value suitable for switching the shift mode.

18. The control method according to claim 17, wherein the gear ratio is controlled so as to achieve a most efficient revolution speed of the internal combustion engine, and the internal combustion engine is controlled so that the internal combustion engine generates torque according to the required output.

19. The control method according to claim 17, further comprising the steps of:
estimating time for the input/output revolution ratio to reach the predetermined value when varying the input/output revolution ratio while involving switching of the shift mode; and
determining timing of starting shift-mode switching control based on the estimated time.

20. The control method according to claim 19, wherein the time for the input/output revolution ratio to reach the predetermined value is estimated based on a variation per unit time in the input/output revolution ratio.

21. The control method according to claim 20, wherein the shift mode is switched by integrating or disengaging the sun gear and the ring gear, and engaging or releasing the carrier and the output shaft of the internal combustion engine.

22. The control method according to claim 19, wherein the controller further comprises a revolution sensor for measuring an input revolution speed and an output revolution speed of the continuously variable transmission; and a timer for measuring a time interval for detecting the revolution speeds, and
when the following equation is satisfied, it is determined that the switching control is to be started:

$$(\gamma_n - \gamma_{min}) \Box T/(\gamma_{n-1} - \gamma_n) \leq Tst$$

where T is the time interval, $\gamma_{n-1}$ and $\gamma_n$ are the input/output revolution ratio calculated from the revolution speeds detected at the time interval T, $\gamma_{min}$ is the predetermined input/output revolution ratio, and Tst is time required to switch the shift mode.

23. The control method according to claim 17, further comprising the step of changing the timing of substantially starting the shift-mode switching control based on duration of the predetermined input/output revolution ratio in a process of varying the input/output revolution ratio while involving switching of the shift mode.

24. The control method according to claim 23, wherein the duration of the predetermined input/output revolution ratio is corrected based on past operation record of the duration.

25. The control method according to claim 23, wherein the controller further comprises a revolution sensor for measuring an input revolution speed and an output revolution speed of the continuously variable transmission; and a timer for measuring a time interval for detecting the revolution speeds, and when the following equation is satisfied, it is determined that the switching control is to be started:

$$(\gamma_n - \gamma_{min}) \Box T/(\gamma_{n-1} - \gamma_n) \leq Tst - \Delta T$$

where T is the time interval, $\gamma_{n-1}$ and $\gamma_n$ are the input/output revolution ratio calculated from the revolution speeds detected at the time interval T, $\gamma_{min}$ is the predetermined input/output revolution ratio, Tst is time required to switch the shift mode, and $\Delta T$ is a correction value based on the past operation record of the duration.

26. A control method of a controller including a power engine and a continuously variable transmission, wherein a transmission coupled to an output of the power engine includes the continuously variable transmission and a gearshift mechanism, the controller is capable of selectively setting a first shift mode in which a gear ratio increases with increase in an input/output revolution ratio, that is, a ratio between an input revolution speed and an output revolution speed of the continuously variable transmission, and a second shift mode in which the gear ratio decreases with increase in the input/output revolution ratio, the control method comprising the steps of:

obtaining target torque based on control data including a required output, and controlling load of the power engine so as to achieve the target torque;

obtaining a target input revolution speed based on the control data and calculating the input/output revolution ratio of the continuously variable transmission so as to achieve the target input revolution speed; and determining a shift mode to be set from the first shift mode and the second shift mode based on the calculated input/output revolution ratio.

27. A vehicular controller comprising:

a transmission coupled to an output of the internal combustion engine, which includes the continuously variable transmission and a gearshift mechanism, an internal combustion engine control portion which obtains target torque based on control data including a required output, and controls load of the internal combustion engine so as to achieve the target torque;

an input/output revolution ratio calculating portion which obtains a target input revolution speed based on the control data, and calculates the input/output revolution ratio of the continuously variable transmission so as to achieve the target input revolution speed; and a shift-mode determining portion which determines a shift mode to be set from a first shift mode in which a gear ratio increases with increase in an input/output revolution ratio, that is, a ratio between an input revolution speed and an output revolution speed of the continuously variable transmission, and a second shift mode in which the gear ratio decreases with increase in the input/output revolution ratio, based on the input/output revolution ratio calculated by the input/output revolution ratio calculating portion.

28. The controller according to claim 27, wherein an input shaft of the continuously variable transmission is coupled to an output shaft of the internal combustion engine, the gearshift mechanism is a planetary gear mechanism, a sun gear of the planetary gear mechanism is engaged so as to rotate in a direction opposite to that of an output shaft of the continuously variable transmission, a carrier of the planetary gear mechanism is capable of being selectively engaged or released so as to rotate in a direction opposite to that of the output shaft of the internal combustion engine, the sun gear and a ring gear are capable of being selectively integrated or disengaged, the first shift mode is set by releasing the carrier and the output shaft of the internal combustion engine and integrating the sun gear and the ring gear, and the second shift mode that defines a range of the gear ratio that is different from that of the first shift mode is set by disengaging the sun sear and the ring gear and engaging the carrier and the output shaft of the internal combustion engine.

29. The controller according to claim 27, wherein the shift mode is switched when the input/output revolution ratio calculated by the input/output revolution ratio calculating portion is within the range of the gear ratio defined by a shift mode other than a current shift mode.

30. The controller according to claim 27, further comprising:

a continuously variable transmission control portion which switches the shift mode and sets the calculated input/output revolution ratio after varying a current input/output revolution ratio to a predetermined value suitable for switching the shift mode.

31. The controller according to claim 30, wherein the continuously variable transmission control portion controls the gear ratio so as to achieve a most efficient revolution speed of the internal combustion engine, and the internal combustion engine control portion controls the internal combustion engine so that the internal combustion engine generates torque according to the required output.

32. The controller according to claim 30, further comprising:

an estimating portion which estimates time for the input/output revolution ratio to reach the predetermined value when varying the input/output revolution ratio while involving switching of the shift mode; and a shift-mode switching control portion which determines timing of starting shift-mode switching control based on the time estimated by the estimating portion.

33. The controller according to claim 32, wherein the estimating portion estimates the time for the input/output revolution ratio to reach the predetermined value based on a variation per unit time in the input/output revolution ratio.

34. The controller according to claim 33, wherein the shift-mode switching control portion integrates or disengages the sun gear and the ring gear, and engages or releases the carrier and the output shaft of the internal combustion engine based on the time estimated by the estimating portion.

35. The controller according to claim 32, further comprising:
 a revolution sensor for detecting an input revolution speed and an output revolution speed of the continuously variable transmission; and
 a timer for measuring a time interval for detecting the revolution speeds,
 wherein
  when the following equation is satisfied, it is determined that the switching control is to be started:

$$(\gamma_n - \gamma_{min}) \Box T/(\gamma_{n-1} - \gamma_n) \leq Tst$$

where T is the time interval,
 $\gamma_{n-1}$ and $\gamma_n$ are the input/output revolution ratio calculated from the revolution speeds detected at the time interval T,
 $\gamma_{min}$ is the predetermined input/output revolution ratio, and
 Tst is time required to switch the shift mode.

36. The controller according to claim 30, further comprising a shift-mode switching control portion which changes the timing of substantially starting the shift-mode switching control based on duration of the predetermined input/output revolution ratio in a process of varying the input/output revolution ratio while involving switching of the shift mode.

37. The controller according to claim 36, wherein the duration of the predetermined input/output revolution ratio is corrected based on past operation record of the duration.

38. The controller according to claim 36, further comprising:
 a revolution sensor for measuring an input revolution speed and an output revolution speed of the continuously variable transmission; and
 a timer for measuring a time interval for detecting the revolution speeds,
 wherein when the following equation is satisfied, it is determined that the switching control is to be started:

$$(\gamma_n - \gamma_{min}) \Box T/(\gamma_{n-1} - \gamma_n) \leq Tst - \Delta T$$

where T is the time interval,
 $\gamma_{n-1}$ and $\gamma_n$ are the input/output revolution ratio calculated from the revolution speeds detected at the time interval T,
 $\gamma_{min}$ is the predetermined input/output revolution ratio,
 Tst is time required to switch the shift mode, and
 $\Delta T$ is a correction value based on the past operation record of the duration.

39. A vehicular controller comprising:
 an internal combustion engine:
 a transmission coupled to an output of the internal combustion engine, which includes the continuously variable transmission and a gearshift mechanism,
 an internal combustion engine control portion which obtains target torque based on control data including a required output, and controls load of the internal combustion engine so as to achieve the target torque;
  an input/output revolution ratio calculating portion which obtains a target input revolution speed based on the control data, and calculates the input/output revolution ratio of the continuously variable transmission so as to achieve the target input revolution speed; and
  a shift-mode determining portion which determines a shift mode to be set from a first shift mode in which a gear ratio increases with increase in an input/output revolution ratio, that is, a ratio between an input revolution speed and an output revolution speed of the continuously variable transmission, and a second shift mode in which the near ratio decreases with increase in the input/output revolution ratio, based on the input/output revolution ratio calculated by the input/output revolution ratio calculating portion.

* * * * *